(12) United States Patent
Firestone (10) Patent No.: US 10,516,728 B2
(45) Date of Patent: Dec. 24, 2019

(54) VIRTUAL FILTERING PLATFORM IN DISTRIBUTED COMPUTING SYSTEMS

(71) Applicant: Microsoft Technology Licensing, LLC, Redmond, WA (US)

(72) Inventor: Daniel Firestone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 15/639,319

(22) Filed: Jun. 30, 2017

(65) Prior Publication Data

US 2018/0262556 A1 Sep. 13, 2018

Related U.S. Application Data

(60) Provisional application No. 62/469,696, filed on Mar. 10, 2017.

(51) Int. Cl.
| | |
|---|---|
| *H04L 29/06* | (2006.01) |
| *H04L 29/08* | (2006.01) |
| *H04L 12/931* | (2013.01) |
| *H04L 12/851* | (2013.01) |
| *H04L 12/747* | (2013.01) |

(Continued)

(52) U.S. Cl.
CPC .......... *H04L 67/10* (2013.01); *G06F 9/45558* (2013.01); *H04L 45/54* (2013.01); *H04L 45/586* (2013.01); *H04L 45/742* (2013.01); *H04L 47/2441* (2013.01); *H04L 47/2483* (2013.01); *H04L 49/70* (2013.01); *H04L 69/22* (2013.01); *G06F 2009/45595* (2013.01);

(Continued)

(58) Field of Classification Search
CPC ............. G06F 9/45558; H04L 61/2503; H04L 45/745
USPC ........ 709/201, 226, 227, 228, 249; 370/219, 370/316, 389, 401; 718/1, 104, 105
See application file for complete search history.

(56) References Cited

U.S. PATENT DOCUMENTS 8,930,690 B2 * 1/2015 Zuo .................... H04L 47/20 713/162
9,509,809 B2 * 11/2016 Laufer .................. H04L 69/22

(Continued)

FOREIGN PATENT DOCUMENTS

WO 2017018989 A1 2/2017

OTHER PUBLICATIONS

"Mapping Match Action Tables to Switches"—Jose et al, Stanford University, Jul. 2014 https://www.usenix.org/sites/default/files/ons2014-poster-jose.pdf (Year: 2014).*

(Continued)

*Primary Examiner* — Randy A Scott
(74) *Attorney, Agent, or Firm* — Liang IP, PLLC (57) ABSTRACT

Computing systems, devices, and associated methods of operation of filtering packets at virtual switches implemented at hosts in a distributed computing system are disclosed herein. In one embodiment, a method includes receiving, at the virtual switch, a packet having a header and a payload and processing, at the virtual switch, the received packet based on multiple match action tables arranged in a hierarchy in which first and second layers individually contain one or more match action tables that individually contain one or more entries each containing a condition and a corresponding processing action.

20 Claims, 8 Drawing Sheets

(51) Int. Cl.
*H04L 12/741* (2013.01)
*H04L 12/713* (2013.01)
*G06F 9/455* (2018.01)
*H04L 29/12* (2006.01)

(52) U.S. Cl.
CPC ........ *H04L 61/2503* (2013.01); *H04L 69/325* (2013.01); *H04L 69/326* (2013.01)

(56) References Cited

U.S. PATENT DOCUMENTS

| | | | | |
|---|---|---|---|---|
| 2013/0067067 | A1* | 3/2013 | Miri | .................... H04L 41/069 709/224 |
| 2014/0334489 | A1 | 11/2014 | Bosshart et al. | |
| 2015/0078384 | A1 | 3/2015 | Jackson et al. | |
| 2015/0244842 | A1* | 8/2015 | Laufer | .................... H04L 69/22 370/392 |
| 2017/0026283 | A1 | 1/2017 | Williams et al. | |
| 2017/0048200 | A1* | 2/2017 | Chastain | ............. H04L 63/0272 |
| 2017/0085479 | A1 | 3/2017 | Wang et al. | |
| 2018/0262599 | A1 | 9/2018 | Firestone | |

OTHER PUBLICATIONS

Lajos, Zoltan Kis., et al., "OpenFlow Switch Specification", Version 1.2 ( Wire Protocol 0x03 ), Dec. 5, 2011, 83 Pages.

"International Search Report and Written Opinion Issued in PCT Application No. PCT/US18/020990", dated Jun. 14, 2018, 17 Pages.

"International Search Report and Written Opinion Issued in PCT Application No. PCT/US2018/020991", dated Jun. 14, 2018, 13 Pages.

"Non Final Office Action Issued in U.S. Appl. No. 15/639,331", dated Sep. 14, 2018, 11 Pages.

"Non-Final Office Action Issued in U.S. Appl. No. 15/639,331", dated Mar. 8, 2019, 14 Pages.

"Notice of Allowance Issued in U.S. Appl. No. 15/639,331", filed Aug. 8, 2019, 5 pages.

* cited by examiner

| Conditions | Actions |
|---|---|
| Source/Dest MAC | Allow/Block (Stateful/Stateless) |
| Source/Dest IP | NAT (L3/L4), (Stateful/Stateless) |
| Source/Dest TCP Port | |
| Source/Dest UDP Port | Encap/Decap |
| GRE Key | QoS – Rate Limit, Mark DSCP, Meter |
| VXLAN VNI | |
| VLAN ID | Encrypt/Decrypt |
| Metadata From Previous Layer | Stateful Tunneling |
| | Routing (ECMP) |

VIRTUAL FILTERING PLATFORM IN DISTRIBUTED COMPUTING SYSTEMS

CROSS-REFERENCE TO RELATED APPLICATION(S)

This application is a non-provisional application of and claims priority to U.S. Provisional Application No. 62/469,696, filed on Mar. 10, 2017, the disclosure of which is incorporated herein in its entirety.

BACKGROUND

Distributed computing systems typically include routers, switches, bridges, and other physical network devices that interconnect a large number of servers, network storage devices, and other types of computing devices. The individual servers can host one or more virtual machines ("VMs") or other types of virtualized components. The virtual machines can facilitate execution of suitable applications to provide desired cloud services or other suitable computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The rise of public cloud services, such as Amazon Web Services®, Microsoft Azure®, and Google Cloud Platform® has created large scales of datacenter computing. Data centers providing public cloud services regularly involve server counts in the millions. Cloud service providers not only need to provide scale, high density, and high performance of VMs to customers, but also rich network semantics, such as private virtual networks with customer supplied address spaces, scalable load balancers, security groups and Access Control Lists ("ACLs"), virtual routing tables, bandwidth metering, Quality of Service ("QoS"), etc.

Traditional core routers and hardware may not be economically implemented at scale to provide levels of network performance needed for large scale data centers. Instead, one approach is to implement network policies in software on VM hosts and in virtual switches that connect VMs to a computer network. As this implementation separates a centralized control plane from a data plane on a host, such a technique can be considered an example of Software Defined Networking ("SDN"), and in particular, host-based SDN. Implementations of host-based SDN, however, often assume a single network controller that has overall responsibility in programming the virtual switches. However, the inventor has recognized that independent teams often develop and build new network controllers or agents for different applications to provide corresponding cloud computing services. Thus, having a single network controller with overall responsibility in programming the virtual switches can create complex dependencies, negatively impact scalability, and significantly reduce serviceability of the virtual switches.

Several embodiments of the disclosed technology are directed to a programmable virtual filtering platform for virtual switches. The virtual filtering platform implements a programming model that not only allows distinct network controllers (e.g., SDN controllers) to independently create and define own policies and actions, but also enforce layering and boundaries between the defined policies and actions. For example, rules with arbitrary GOTOs to other tables may be disallowed. As such, new network controllers can develop to add functionality to virtual switches without impacting policies created by existing network controllers, and vice versa.

In certain embodiments, the programming model can include policies and actions in the form of Match Action Tables ("MATs") that are organized as multiple network filter objects in a hierarchy. Network controllers can independently create, program, and/or update the network filter objects according to target SDN policies and actions. Example of such network filter objects can include port, layer, group, and/or rule objects in a top-to-bottom hierarchical order. The virtual switch can utilize each of the foregoing network filter objects when processing incoming and outgoing packets, as described in more detail below. In other examples, the network filter objects can be organized as a single sequence, multiple sequences, or in other suitable manners.

In certain implementations, port objects can be basic units of network filtering policies. Each port object can correspond to a virtual port in a virtual switch, as specified by, for instance, an IP address and a TCP port number in a virtual network. Each port object can include multiple MATs based on which the virtual switch can act as one or more network filters on inbound or outbound path of a corresponding virtual port. Typically, network controllers can program network policies on behalf of a virtual machine or virtual network interface card ("VNIC"). As such, separation of the port objects can allow the network controllers to independently manage SDN policies on various virtual machines. In other implementations, port objects can be replaced by virtual network objects, tenant site objects, or other suitable types of objects.

Policies included in a port object can be further divided into multiple layer objects arranged in a sequential manner. Layer objects can each include one or more MATs that network controllers can use to specify network filtering policies. Different network controllers can separately create, update, or otherwise manage each of the layer objects, or one network controller can create several layer objects. Each layer object can contain a MAT with inbound and outbound rules (as contained in rule objects) reflecting corresponding policies that can filter and modify incoming and outgoing packets. Logically, packets go through each layer objects one by one to match rules in each based on a state of the individual packets after one or more actions performed in a previous layer object. Network controllers can specify a sequence of the multiple layer objects for a virtual port or port object with respect to one another, and create, modify, and/or remove layer objects dynamically during operation.

Rule objects can include entries of a MAT. Each entry (or "rules") can define conditions and corresponding actions on matching packets. Rule objects can allow a network controller to be expressive while minimizing fixed policy in a data plane. In certain embodiments, rules can include a condition list coupled with an action. The condition list can include one or more conditions individually include a rule type (e.g., source IP address) and a list of one or more matching values (e.g., an IP address, a range of IP addresses, a prefix of IP addresses, etc.). The matching values can thus be a singleton, range, or prefix. For a condition to match a packet, any of the matching values can match, as in an OR clause. For a rule object to match, all conditions in the rule much match, as in an AND clause. The action can contain an action type (e.g., packet encapsulation) and a data structure specific to that action type with corresponding data to perform the action (e.g., encapsulation header values). For example, an encapsulation rule can include an action of packet encapsulation that uses input data of source/destination IP addresses, source/destination media access control ("MAC") addresses, an encapsulation format, and/or key in encapsulating a packet that matches the list of conditions of the rule object.

In some implementations, rule objects in a layer object can be logically organized into one or more groups represented by group objects for management purposes such as transactional updates. For example, rule objects related to virtual network operations, network name translations, or access control list operations can be grouped into separate group objects that correspond to MATs. When classifying packets, all group objects in a layer object can be iterated to locate, for instance, a single rule (e.g., a highest priority rule) in each group that matches the packet. In certain embodiments, a rule object matched by a last group can be selected. In other embodiments, a rule object can also be marked "terminating" to indicate that if a packet matches the rule object, the action of the rule object would be applied immediately without traversing additional groups. Group objects can also have conditions similar to rule objects. For instance, if a packet does not match a condition associated with a group object, the group object and associated rule objects contained therein can be skipped when iterating through all the group objects. In other embodiments, the group objects may be omitted, and a layer object can include multiple rules of different types.

In operation, when a packet is received at the virtual switch, the virtual switch can iterate through all the rules in all group objects in each layer to match the packet. The virtual switch can then perform the action associated with the matching rule on the packet before iterating all the rules in all groups objects in the next layer object. In one example, the virtual switch can iterate through layer objects containing policies related to virtual network operations (e.g., converting between a virtual network address and a physical network address), network address translations (e.g., translation between a virtual IP address and a direct IP address), access control list operations (e.g., determining whether access rights are allowed, denied, or audited), and metering operations (e.g., packet buffering and QoS control) in sequence. In other examples, the virtual switch can filter the received packets based on priority or other suitable criteria.

By enforcing layering of the layer objects with associated group and/or rule objects, the virtual switch can process all the network filtering policies developed and created by independent network controllers. For example, a first network controller can develop and create a first layer object related to operations of virtual network operations while a second network controller can develop and create a second layer object related to network address translations. By separating such filtering policies into independent layer objects, policies related to each layer object can be managed independently without affecting operations of the other layer object. For instance, the first network controller can update the first layer object with new policies related to operations of virtual network operations without affecting operations of the second layer object because filtering of any incoming and outgoing packets is performed in an accumulative fashion. As such, several embodiments of the disclosed technology can have great flexibility in allowing independent development of network filtering policies without affecting enforcement of other policies by the virtual switch.

DETAILED DESCRIPTION

Certain embodiments of systems, devices, components, modules, routines, data structures, and processes for filtering packets at virtual switches implemented at hosts in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-10.

As used herein, the term "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, a "virtual switch" generally refers to a logical switching fabric provided by executing a software program on a computing device for facilitating network communications to and from virtual machines hosted on the computing device. A virtual switch can intelligently direct communications on a computer network by inspecting packets before passing the packets to suitable destinations. In certain implementations, software programs of virtual switches can be embedded or otherwise included in a virtualization component such as Hyper-V native hypervisor provided by Microsoft Corporation of Redmond, Wash. In other implementations, virtual switches can also be included as a firmware component in hardware of a computing device.

Figure 5:
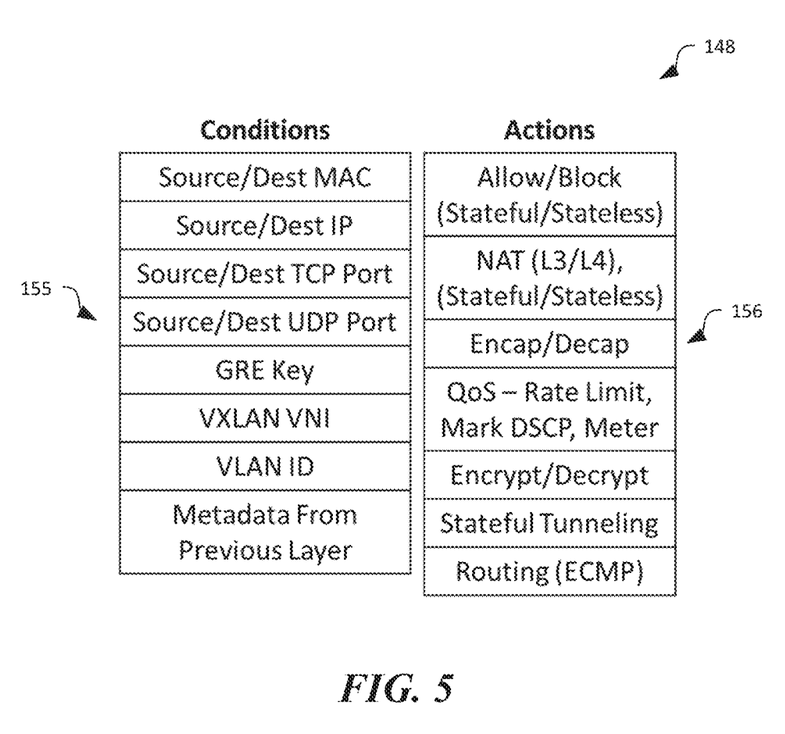
FIG. 5 is a schematic diagram illustrating example conditions and corresponding actions for a rule object suitable for a virtual switch in accordance with embodiments of the disclosed technology.

Further used herein, a Match Action Table ("MAT") generally refers to a data structure having multiple entries in a table format. Each of the entries can include one or more conditions and a corresponding action. The conditions can be configured by a network controller (e.g., an SDN controller) for matching a set of header fields of a packet. The action can also be configured by the network controller to apply an operation to the packet when the conditions match the set of header fields of the packet. Example conditions and actions are shown in FIG. 5.

Many modern scalable cloud networking architectures rely on host networking for implementing VM network policies. Examples of such policies can include tunneling for virtual networks, network address translation ("NAT") for load balancing, stateful access control lists ("ACLs"), quality of service ("QoS"), and other suitable types of procedures. Several embodiments of the disclosed technology are directed to a programmable virtual switch platform that can provide such policies to power a public cloud or other suitable distributed computing systems. Embodiments of the platform can support multiple independent network controllers to develop and create policies, policies based on connections rather than packets, efficient caching and classification for performance, and efficient offload of flow policies to programmable network interface cards ("NICs"). Embodiments of the platform can be deployed on hosts running Infrastructure as a service ("IaaS"), Platform as a service ("PaaS"), or other suitable types of workloads.

Throughout the description below, two examples are used to illustrate how the programmable virtual switch platform supports policies and actions. The first example is a VL2 network useable to create virtual networks ("VNETs") on shared hardware using stateless tunneling between hosts. The second example is a scalable Layer-4 load balancer, which scales by running the load balancing NAT in the virtual switch on end-point hosts, leaving the in-network load balancers stateless and scalable. Even though the descriptions below are related to a design of virtual switches and related Application Programming Interface ("API") as applied to a distributed computing system, in other embodiments, the disclosed techniques can also have other suitable designs that are applied to other suitable types of computing systems, such as those without support for virtual machines.

Figure 1:
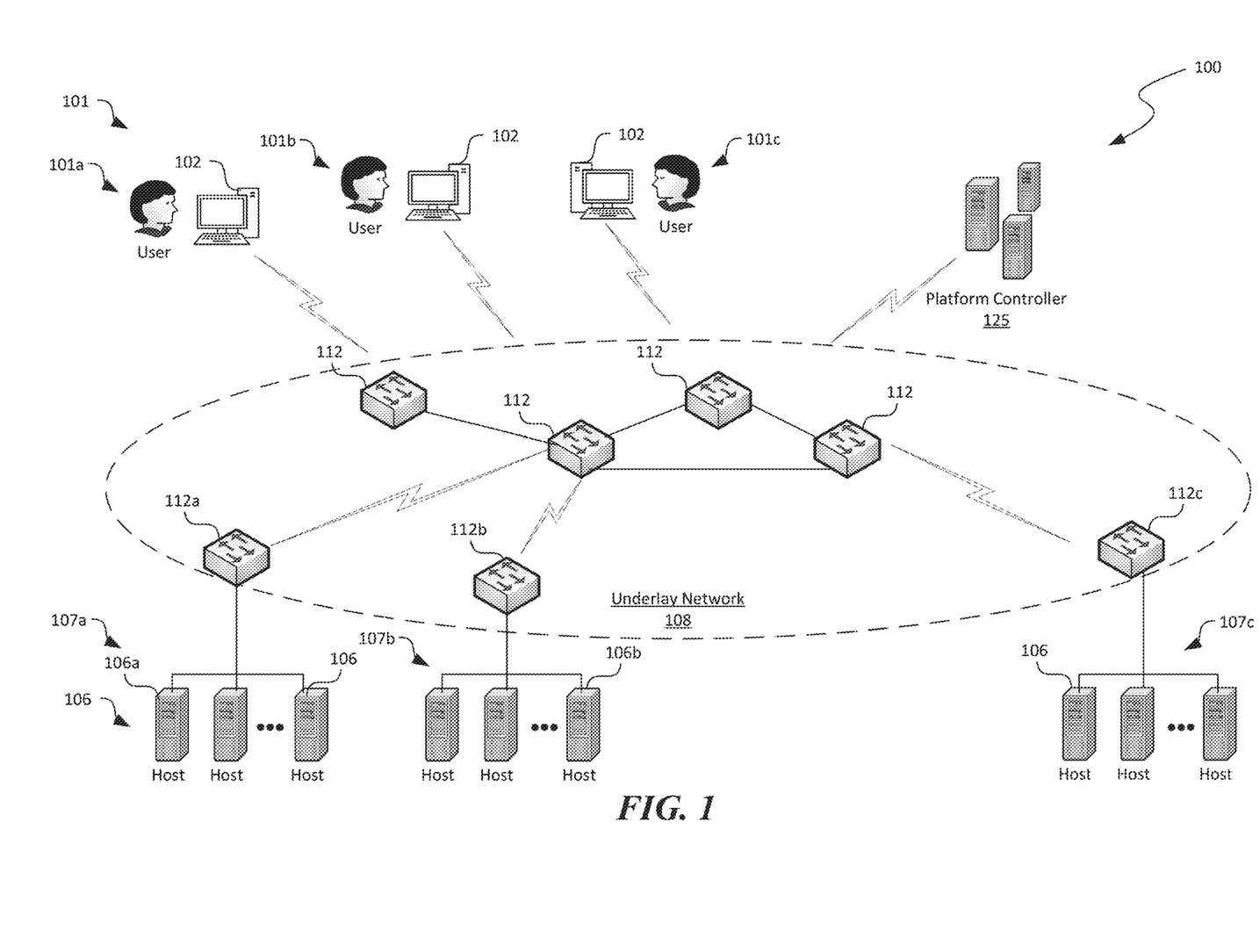
FIG. 1 is a schematic diagram illustrating a distributed computing system implementing a virtual filtering platform in accordance with embodiments of the disclosed technology.

FIG. 1 is a schematic diagram illustrating a distributed computing system 100 implementing a virtual filtering platform in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown).

As shown in FIG. 1, the underlay network 108 can include one or more network nodes 112 that interconnect the multiple hosts 106 and the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The underlay network can allow communication between hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the initiated virtual machines 144 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
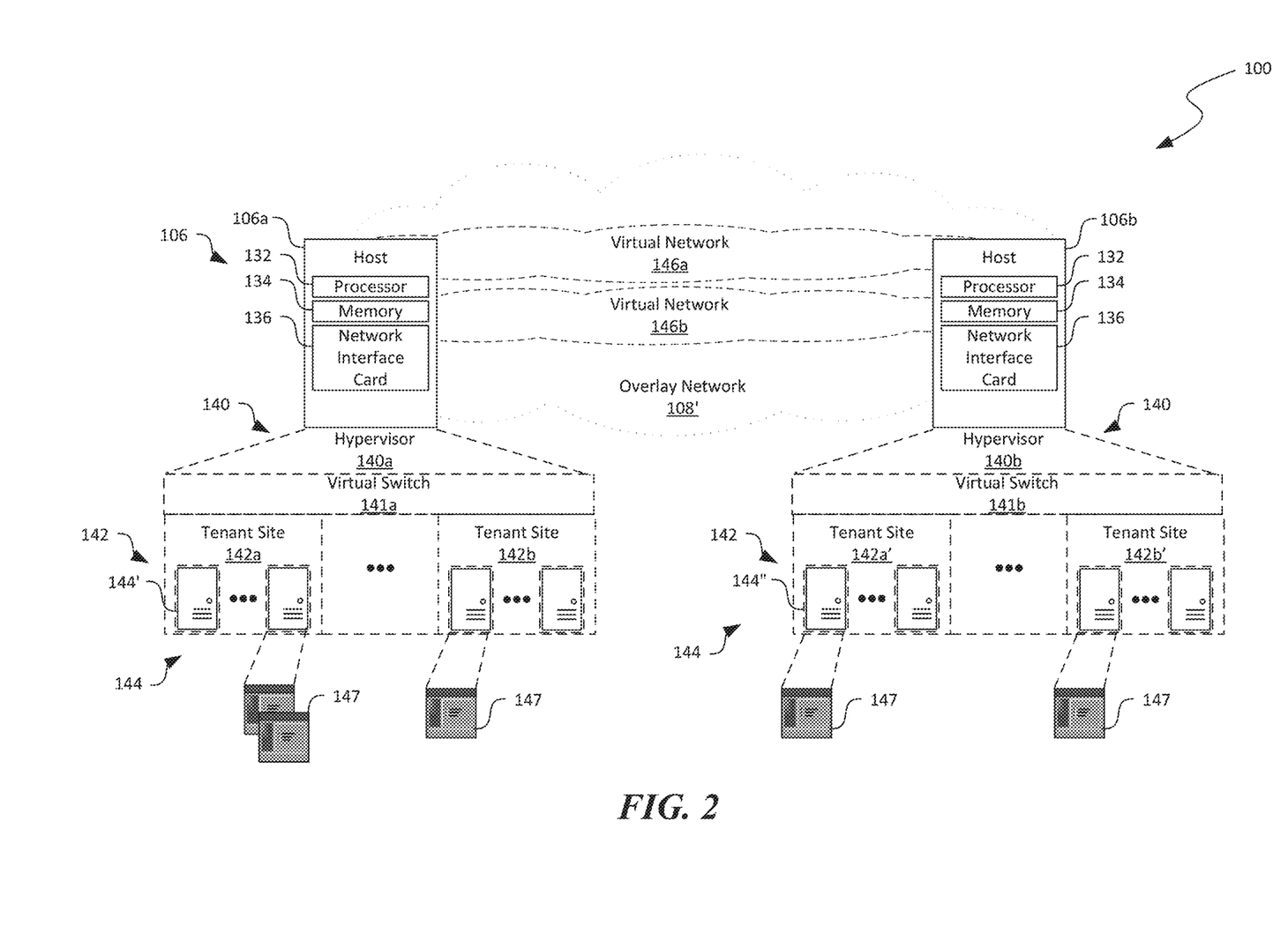
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and network interface card 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The network interface card 136 can include a network adapter, a LAN adapter, physical network interface, or other suitable types of hardware component that connects a host 106 to the underlay network 108 (FIG. 1). In other embodiments, the hosts 106 can also include input/output devices configured to accept input from and provide output to an operator and/or an automated software controller (not shown), or other suitable types of hardware components.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

To facilitate communications among the virtual machines 144, the virtual switches 141 can be configured to switch or filter packets (not shown) directed to different virtual machines 144. As described in more detail below with reference to FIGS. 3-9A, the virtual switches 141 can be implemented with a virtual filtering platform in which various network filter objects can be organized in a hierarchy of port, layer, group, and rule objects in accordance with embodiments of the disclosed technology. By enforcing layering of the various network filter objects, different network controllers 116 (e.g., SDN controllers, shown in FIG. 3) can independently program and configure the various network filter objects with various policies without affecting enforcement of other policies by the virtual switches 141.

Figure 3:
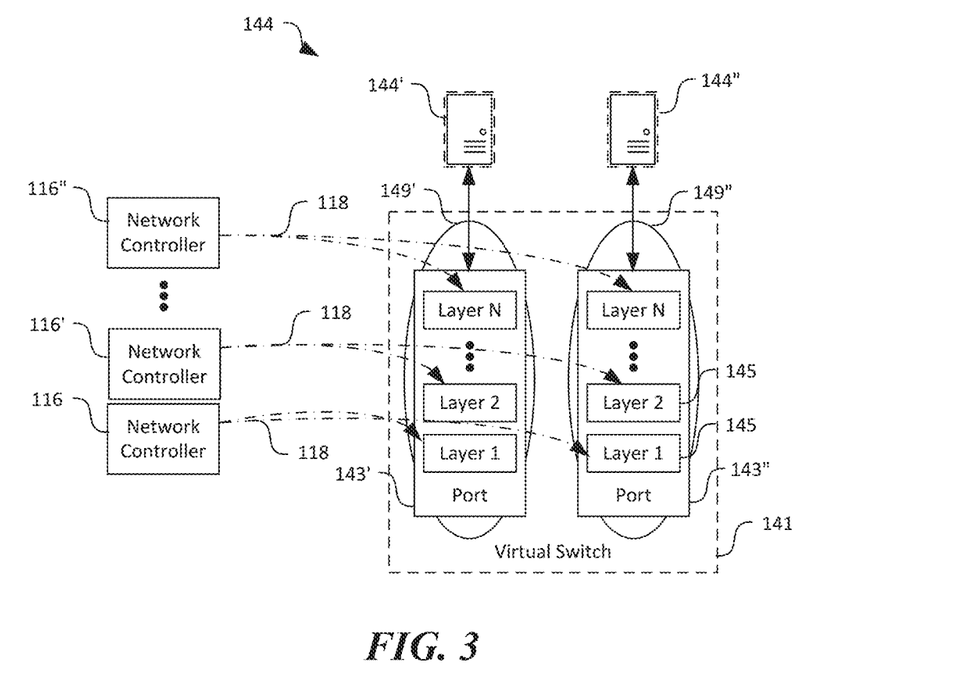
FIG. 3 is a schematic diagram illustrating a virtual switch implemented at a host in a distributed computing system in accordance with embodiments of the disclosed technology.

FIG. 3 is a schematic diagram illustrating a virtual switch 141 implemented at a host 106 in the distributed computing system of FIGS. 1 and 2 in accordance with embodiments of the disclosed technology. As shown in FIG. 3, the virtual switch 141 can include one or more virtual ports 149 (identified individually as first and second virtual ports 149' and 149"). The virtual ports 149 can each include a data object that represents an internal port on the network interface card 136 (FIG. 2) that supports single root I/O virtualization. Each virtual port 149 can correspond to one of the virtual machines 144. For example, as shown in FIG. 3, the first virtual port 149' corresponds to the first virtual machine 144', and the second virtual port 149" corresponds to the second virtual machine 144". The virtual ports 149 can, for instance, be connected to virtual NICs (VNICs). In other embodiments, a single virtual port 149 may correspond to multiple virtual machines 144 by implementing, for example, virtual queues (not shown) or other suitable data channels.

For each of the virtual ports 149, the virtual switch 141 can be configured to filter incoming or outgoing packets from a VNIC to the virtual switch 141 and from the virtual switch 141 to a VNIC based on one or more network filter objects. From the perspective of a virtual machine 144 with a VNIC attached to a virtual port 149, ingress traffic to the virtual switch 141 is considered "outbound" traffic from the virtual machine 144, and egress traffic from the virtual switch 141 is considered "inbound" traffic to the virtual machine 144.

As used herein, a "network filter object" generally refers to a software object or a set of software objects individually containing one or more conditions, actions, or other suitable information that instructs the virtual switch 141 on performance of the one or more actions when a packet meets the one or more conditions. In one example, certain header fields of a packet can be extracted and compared to one or more conditions. If the header fields of the packet contain values that match the conditions, the virtual switch 141 can perform corresponding actions on the packet. On the other hand, if the header fields of the packet do not contain values that match the conditions, the virtual switch 141 can skip performing the corresponding actions on the packet. Thus, each network filter object can include one or more MATs based on which the virtual switch 141 can act as one or more virtual network filters on inbound or outbound path of a corresponding virtual port 149.

In the illustrated embodiment in FIG. 3, each virtual port 149 can correspond to a port object 143, which in turn includes multiple layer objects 145 (shown as "Layer 1," "Layer 2," . . . , "Layer N"). As discussed in more detail below with reference to FIG. 4, each layer object 145 (or "a layer") can further include multiple group objects (or "groups") 146, which in turn can include multiple rule objects (or "rules") 148. Thus, an example hierarchy of the various network filter objects can include:

Ports, as a basic unit that policy filters on;
Layers, stateful flow tables that hold MAT policies;
Groups, entities to manage and control related sets of rules within a layer; and
Rules, match action table entries with one or more conditions and actions.

In certain implementations, the foregoing network filter objects can be programmed with a priority value, in which order the network filter objects can be processed by rule matching. In other implementations, the network filter objects can have the same priority level and be processed sequentially, randomly, or in other suitable manners.

Layers 145 can include basic MATs that the network controllers 116 use to specify desired policies. Layers 145 can be created and managed separately by different network controllers 116, or one network controllers 116 can create several layers 145. Each layer 145 can contain inbound and outbound rules 148 reflecting corresponding policies that can filter and modify packets. Logically, packets go through each layer 145 one by one, matching rules 148 in each based on a state of the packets after the action performed in the previous layer 145. The network controllers 116 can specify the ordering of layers 145 with respect to other layers 145, and create and remove layers 145 dynamically during operation. In other embodiments, multiple virtual ports 149 may correspond to a single port object 143. In further embodiments, the multiple network filter objects may have other suitable data structures and/or organizations.

By utilizing a programming model based on a hierarchy of the foregoing network filter objects, separate network controllers 161 (illustrated as first, second, and third network controllers 116, 116', and 116", respectively) can create and program to specify desired SDN policies, as indicated by the arrows 118. For example, the first network controller 116 can be configured to create and manage policies for a virtual machine 144 in a virtual network to encapsulate and decapsulate traffic into tunnels. The second network controller 116' can be configured to create and manage policies for network name translation. The third network controller 116" can be configured to create and manage policies for access control lists, metering, or other suitable network operations.

In operation, the virtual switch 141 can filter incoming or outgoing packets based on the various network filter objects, and thereby perform virtual network operations, network name translation, or other suitable operations on the packets.

Packets can traverse layers 145 in the opposite direction during inbound than during outbound traffic. When processing packets 114, the virtual switch 141 can search for a single rule 148 in each layer 145 to match by searching the groups 146 of rules 148 inside a layer 145 for a matching rule 148. The actin of the matched rule 148 is then performed on the packet 114. In certain embodiments, only one rule 148 can match a packet 114 in a layer 145 with other matching rules 148 of lower priority ignored. In other embodiments, more than one rule 148 can match a packet 114 in a layer 145 with corresponding actions performed in an accumulative or other suitable manners.

The foregoing traversing technique gives packets a "layering" effect when the network controllers 116 implement opposite policies on either side of a layer 145. For example, a NAT network controller 116 can create a NAT layer 145 implementing a network address translation. On an inbound direction, the NAT layer 145 can perform network name translation on packets destined to a Virtual IP ("VIP") from VIP to a Direct IP ("DIP"). On the outbound direction, the NAT layer 145 can perform network name translation on packets from DIP to VIP. The NAT layer 145 thus implements an address space boundary. All packets above the NAT layer 145 are in "DIP Space", and all packets below the NAT layer 145 are in "VIP Space". Other network controllers 116 can create other suitable layers 145 above or below this NAT layer 145, and can create rules 148 to match VIPs or DIPs, respectively, without coordination with or involvement of the NAT network controller 116. One example operating sequence is described in more detail below with reference to FIGS. 6A-6B.

Figure 4:
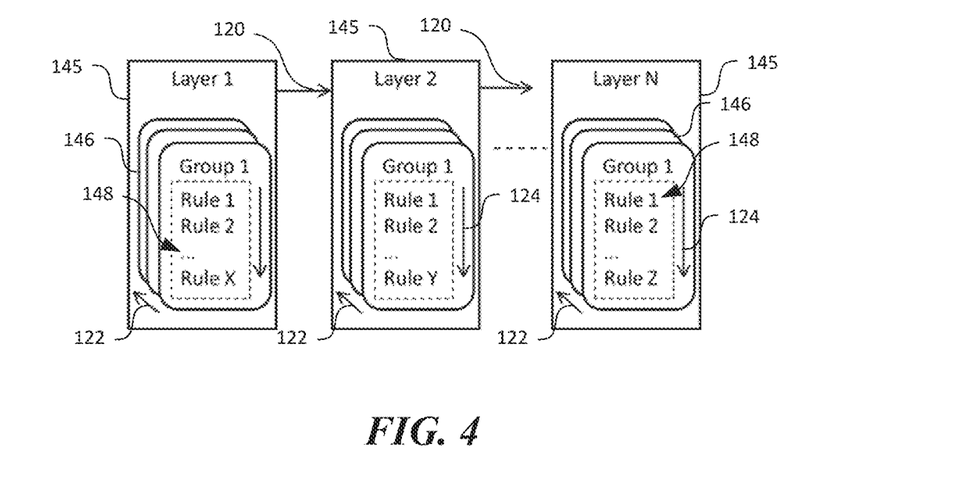
FIG. 4 is a schematic diagram illustrating organization and data flow in a virtual switch implemented at a host in a distributed computing system in accordance with embodiments of the disclosed technology.

FIG. 4 is a schematic diagram illustrating organization and data flow in a virtual switch 141 implemented at a host 106 in a distributed computing system 100 in accordance with embodiments of the disclosed technology. As shown in FIG. 4, layers 145 can be arranged in sequence as "Layer 1," "Layer 2," . . . "Layer N." Each layer 145 can include multiple groups 146, each of which in turn can include multiple rules 148, illustrated as "Rule 1," "Rule 2," . . . , and "Rule X." Also shown in FIG. 4, during matching, each of the layers 145 can be evaluated in sequence, as indicated by the arrows 120. Thus, "Layer 1" can be evaluated before "Layer 2," and so on.

Within each layer 145, rules 148 can be organized into logical groups 146 for management purposes. Groups 146 can be units of policy that can be transactionally updated. When classifying packets 114, the virtual switch 141 can iterate through groups 146 in a layer 145 to find the highest priority rule 148 in each group 146 that matches the packet 144, as indicated by the arrows 122. In one embodiment, the virtual switch 141 can select a rule 148 matched by the last group 146 in a layer 145. In other embodiments, a rule 148 can be marked as "terminating," meaning that if the rule 148 ever matches, action of the rule 148 can be immediately applied without traversing further groups 146. Groups 146 can have conditions just like rules 148. If a condition of a group 146 does not match, the virtual switch 141 can skip the group 146. Below are two examples of how groups 146 can be used for management of different policies in one layer 145:

Groups 146 can be created and managed on a per-container basis by setting an IP condition for virtual machines 144 with Docker-style containers; and For a stateful firewall, infrastructure ACLs and customer ACLs can be expressed as two groups 146 in a layer 145. Block rules in the two groups 146 can be marked terminating. Thus, if either group 146 blocks access, a packet is dropped. Only when both groups 146 of rules 148 allow a packet does the packet go through.

In addition to priority-based matching, individual groups 146 can be Longest Prefix Matching on a condition type (for example, destination IP address) to support routing scenarios, which can be implemented as a compressed trie.

As shown in FIG. 4, within each group 146, the rules 148 can be evaluated in sequence as indicated by the arrows 124. Thus, in the example shown in FIG. 4, "Rule 1" of "Group 1" in "Layer 1" is evaluated first before other groups 146, rules 148, and layers 145 are evaluated. As described in more detail below with reference to FIG. 5, each rule 148 can include one or more conditions and actions. Matching the conditions can cause the virtual switch 141 to perform the corresponding actions.

FIG. 5 is a schematic diagram illustrating example conditions and corresponding actions for a rule object 148 suitable for a virtual switch 141 in accordance with embodiments of the disclosed technology. In certain embodiments, a rule object 148 can be an entity that performs actions on matching packets in a MAT model. When creating a rule object 148, a network controller 116 (FIG. 3) can be expressive while reducing fixed policy in a data plane.

As shown in FIG. 5, the rule object 148 can include a condition list containing multiple conditions 155, and a corresponding action 156. Conditions 155 can have a type (such as source IP address) and a list of matching values (each value may be a singleton, range, or prefix). For a condition to match a packet, any of the matching values can match as in an OR clause. For a rule 148 to match, all conditions 155 in the rule 148 match as in an AND clause. The action 156 can also contain a type and a data structure specific to that type with data needed to perform the action. For example, an encapsulation rule 148 can takes as input data a source/destination IP address, source/destination MAC address, encapsulation format and key to use in encapsulating the packet.

The rule 148 can be implemented via a callback interface, e.g., initialize, process Packet, and de-initialize. If a rule type supports stateful instantiation, the virtual switch 141 (FIG. 3) or other suitable types of process handler can create a pair of flows in a layer 145 (FIG. 3). Flows can also be typed and have a similar callback interface to rules 148. A stateful rule 148 can include a time to live for a flow, which is a time period that a created flows can remain in a flow table after a last packet matches unless expired explicitly by a TCP state machine. In addition to the example set of actions in FIG. 5, user-defined actions can also be added, allowing the network controllers 116 to create own rule types using a language for header field manipulations.

Rules 148 alone may not be suitable for large mapping tables. For example, VNET operations typically involve a CA->PA or PA->CA lookup on outbound/inbound traffic. Several embodiments of the disclosed technology can implement an extensible model of generic resources, for example, a hash table of mappings. A "resource" generally refers to a port-wide data structure that any rule 148 on a port 143 can reference. Another example is a range list, which can implement a dynamic source NAT rule 148.

Figure 6A:
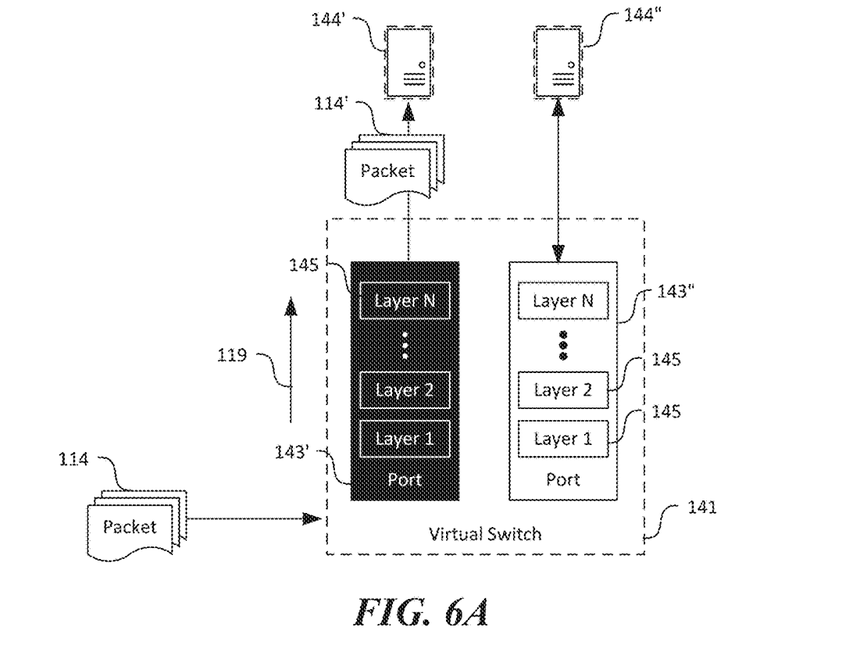
FIGS. 6A-6B are schematic diagrams illustrating incoming and outgoing data processing in a virtual switch implemented at a host in a distributed computing system in accordance with embodiments of the disclosed technology.
Figure 6B:
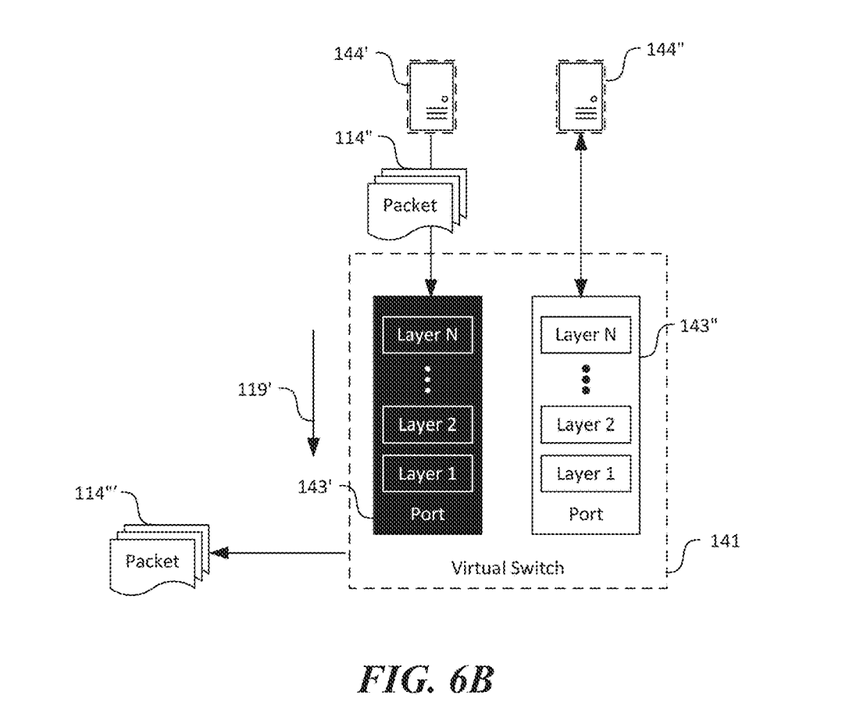

FIGS. 6A-6B are schematic diagrams illustrating incoming and outgoing data processing in a virtual switch 141 implemented at a host 106 in a distributed computing system 100 in accordance with embodiments of the disclosed technology. In particular, FIG. 6A illustrates processing incoming packets while FIG. 6B illustrates processing outgoing packets in the reverse direction. As shown in FIG. 6A, the virtual switch 141 can receive an incoming packet 114. By evaluating certain header fields of the packet 114 according to the port object 143', the virtual switch 141 can determine that the packet 114 is destined to the first virtual machine 144'. Thus, the virtual switch 141 directs the packet 114 to the first port 149' (FIG. 3). The virtual switch 141 can then process the packet 114 based on the various layer, group, or rule objects 145, 146, and 148 in the first port object 143' (shown in reverse contrast for illustration), as indicated by the arrow 119 and discussed above with reference to FIGS. 3 and 4. Once all the layers, groups, and rules 145, 146, and 148 are iterated, the processed packet 114' can be forwarded to the first virtual machine 144'. As shown in FIG. 6B, the first virtual machine 144' can also generate another packet 114'' and forward the generated packet 114'' to the virtual switch 141. In response, the virtual switch 141 can process the received packet 114'' by iterating through the various layers, groups, and rules 145, 146, and 148 in the reverse direction, as indicated by the arrow 119' before forwarding the packet 114''' to, for example, the network interface card 136 in FIG. 2 for transmission to a suitable destination in the distributed computing system 100.

Figure 7:
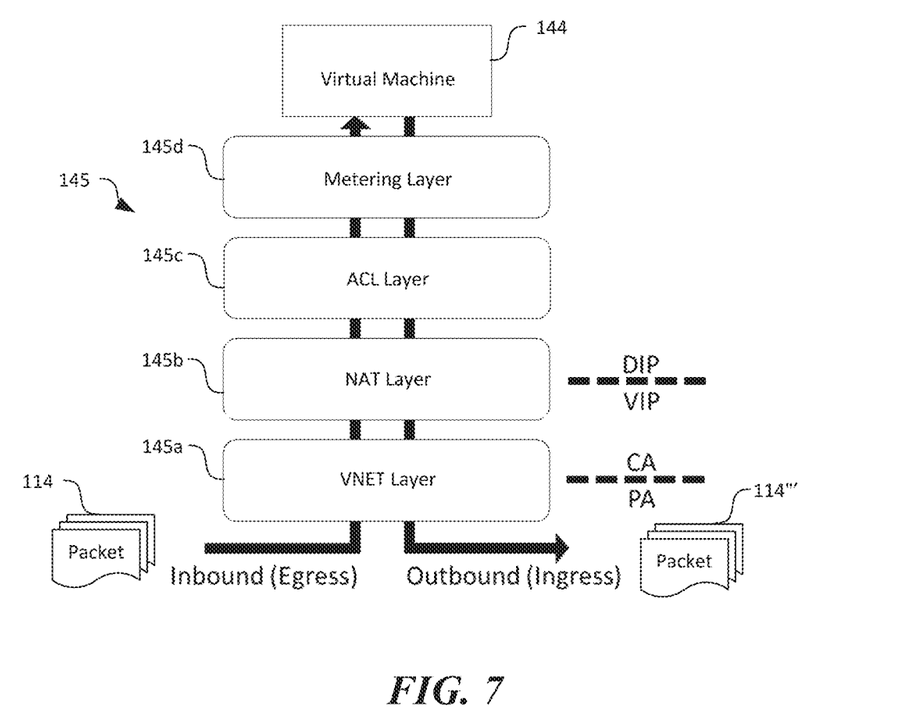
FIG. 7 is a schematic diagram illustrating an example packet processing workflow in a virtual switch implemented at a host in a distributed computing system in accordance with embodiments of the disclosed technology.

FIG. 7 is a schematic diagram illustrating an SDN deployment example in a virtual switch 141 implemented at a host 106 in a distributed computing system 100 in accordance with embodiments of the disclosed technology. As shown in FIG. 6, the example SDN deployment can include four layers 145 arranged in sequence. The four layers 145 include a VNET layer 146A, a NAT layer 146B, a ACL layer 145c, and a metering layer 145d arranged in sequence. In particular, the VNET layer 146A can be programmed by a corresponding network controller 116 (FIG. 3) using tunneling for Customer Addresses ("CAs") so that packets 114 can traverse the underlay network 108 (FIG. 1) in Physical Address ("PA") space recognized by the network nodes 112 (FIG. 1) in a path between virtual machines 144. The VNET layer 146A thus creates a CA/PA boundary by having encapsulation rules 148 (FIG. 4) on the outbound path and decapsulation rules in the inbound path. The NAT layer 146B can be programmed by a different network controller 116 to implement policies for translating VIP and DIP for accommodating, for instance, a load balancer. In addition, the ACL layer 145c can be programmed to implement a stateful firewall above the NAT layer 146B. A security network controller 116, having placed the ACL layer 145c with respect to the VIP/DIP boundaries, can program policies matching DIPs of virtual machines 144 in CA space. The metering layer 145d can be implemented for tracking usage and/or billing is between the ACL layer 145c and the virtual machine 144. The metering layer 145d can implement rules 148 that can meter incoming and outgoing traffic as the user 101 (FIG. 1) of the virtual machine 144 experiences.

Figure 8:
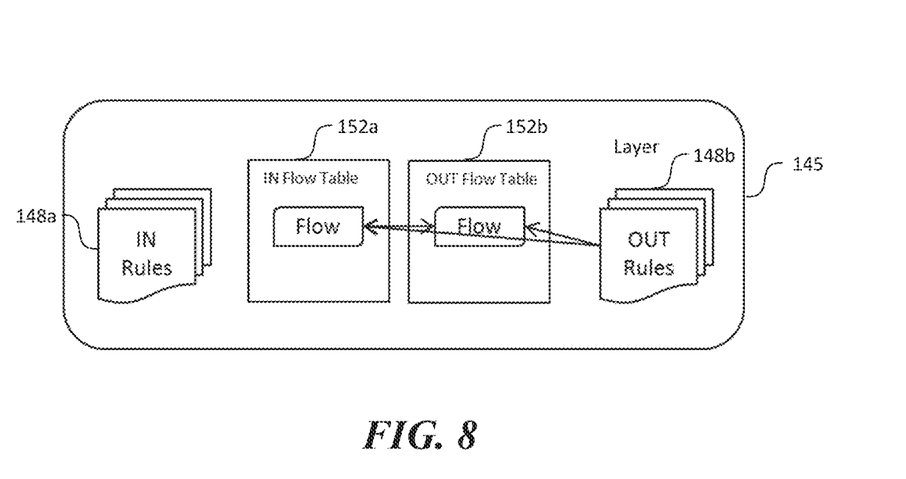
FIG. 8 is a schematic diagram illustrating example flow tables suitable for a virtual switch implemented at a host in a distributed computing system in accordance with embodiments of the disclosed technology.

Layering can be a model on which to implement stateful policies. Packets on a given connection can be in the same IP/Port state on both the inbound and outbound path, flow state may be maintained on a layer 145 by assuming that a TCP or User Datagram Protocol ("UDP") 5-tuple (Source-IP, Destination-IP, IP Protocol, Source Port, Destination Port) is the opposite on each side of the layer 145, and encoding that in a hash table of all connections in either direction. As shown in FIG. 8, when a stateful rule is matched, the layer 145 can create both an inbound and outbound flow in corresponding layer flow tables 152a and 152b. The flow or packet traffic in the direction of the rule 148 having the action of the rule 148, and the opposite direction taking the opposite action to maintain layering. Such inbound and outbound flows are considered paired because their actions simply change the packet 114 (FIG. 6) to the state of the opposite flow in the pair rather than carrying own action context.

Figure 9A:
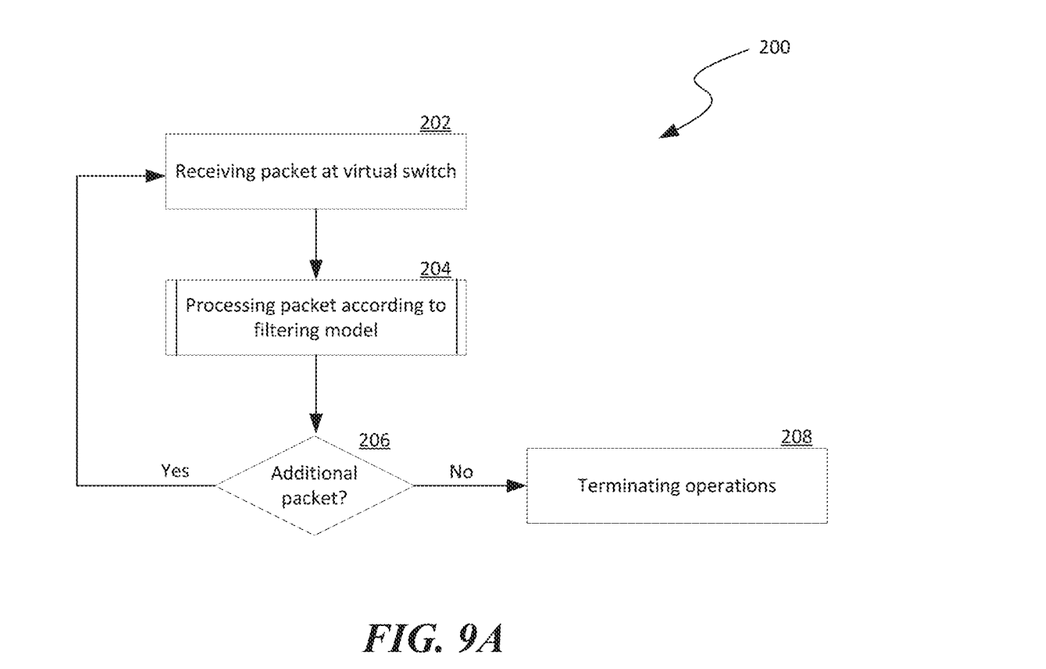
FIGS. 9A-9B are flowcharts illustrating processes for processing incoming/outgoing packets in a virtual switch in accordance with embodiments of the disclosed technology.
Figure 9B:
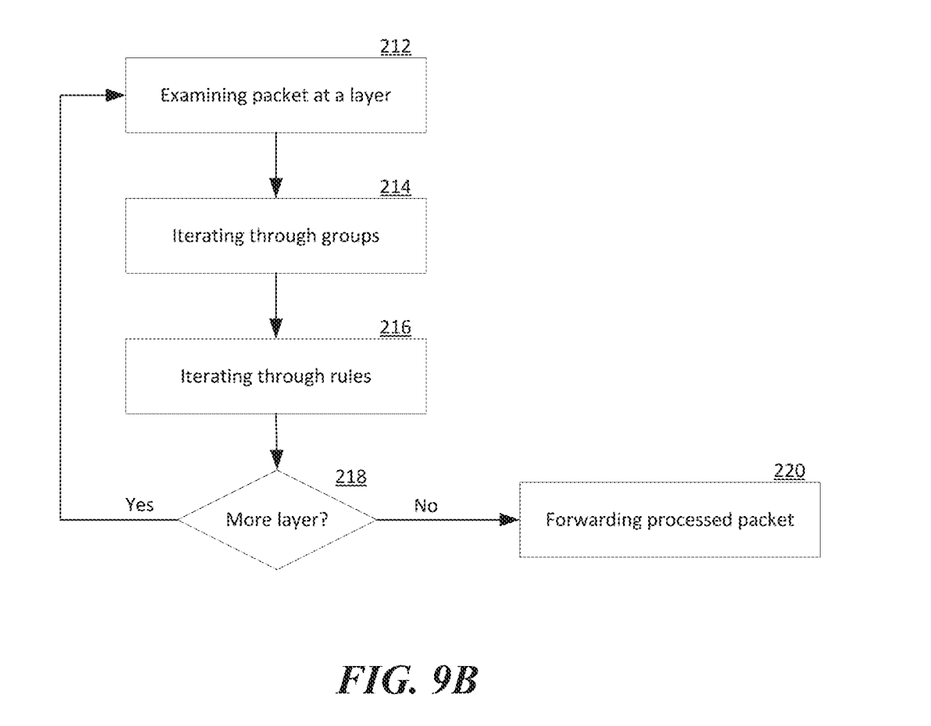

FIGS. 9A-9B are flowcharts illustrating certain processes for processing incoming/outgoing packets in a virtual switch in accordance with embodiments of the disclosed technology. Even though aspects of the processes are described below with reference to the distributed computing system 100 of FIGS. 1 and 2, in other embodiments, the processes can also be implemented in other suitable computing systems with additional and/or different components.

As shown in FIG. 9A, a process 200 can include receiving a packet at a virtual switch at stage 202. The packet can include a header with multiple header fields containing values such as source/destination IP addresses, source/destination ports, and/or other suitable information. The process 200 can then include processing the received packet based on multiple layer, group, and rule objects 145, 146, and 148 (FIG. 4) arranged in a hierarchy. The multiple layer objects individually contain one or more group objects that individually contain one or more rule objects. Each of the rule objects can contain one or more conditions and a corresponding action performable by the virtual switch on the packet. Example operations suitable for such processing is described below with reference to FIG. 9B. The process 200 can then include a decision stage 206 to determine whether additional packets are received. In response to determining that additional packets are received, the process 200 reverts to receiving packet at the virtual switch at stage 202. Otherwise, the process 200 proceeds to terminating operations at stage 208.

As shown in FIG. 9B, processing the packet can include examining the packet at a layer at stage 212. The layer may include multiple groups. Thus, the operations can include iterating through the groups at stage 214. Each group may include multiple rules. Thus, the operations can include iterating through the rules in each group at stage 216. Iterating through the rules can include determining whether a value in one or more of the header fields of the packet matches the one or more conditions of one of the rules in a group of the layer. In response to determining that there is a match, applying the action of the rule to the packet. The operations can then include a decision stage 216 to determine whether additional layers are present. In response to determining that additional layers are present, the operations include passing the packet with the applied action to the next layer at stage 212. Otherwise, the operations can include forwarding the processed packet to, for instance, a virtual machine or a network interface card at stage 220.

Figure 10:
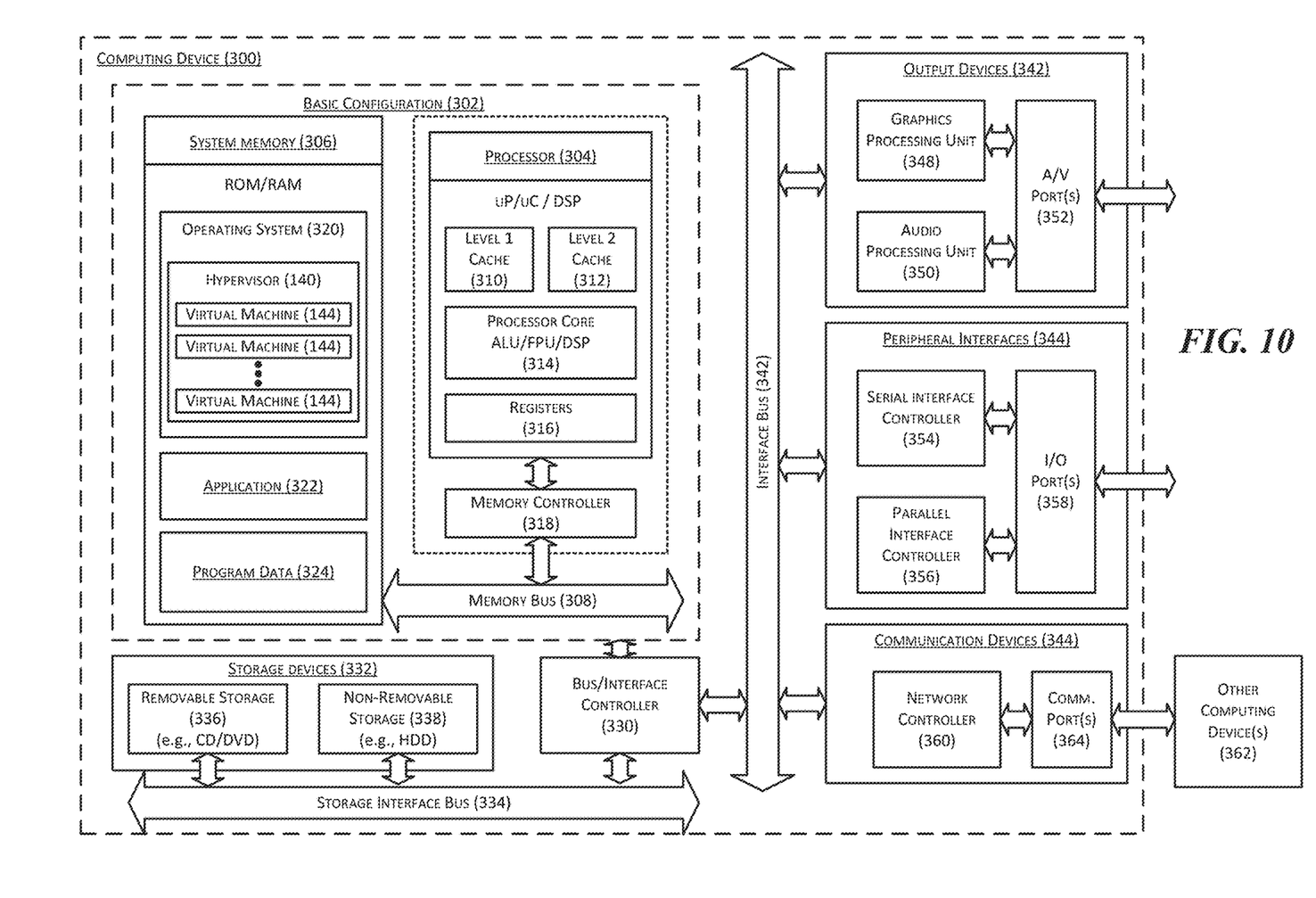
FIG. 10 is a computing device suitable for certain components of the distributed computing system in FIG. 1.

FIG. 10 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for facilitation communication in a distributed computing system having hosts individually supporting a virtual switch and one or more virtual machines, comprising:

receiving, at the virtual switch, a packet having a header with multiple header fields and a payload;

processing, at the virtual switch, the received packet based on multiple layer, group, and rule objects arranged in a hierarchy in which the multiple layer objects are arranged in a sequence at the same level in the hierarchy and individually contain one or more group objects that are arranged in a sequence at the same level in the hierarchy and that individually contain one or more rule objects, each of the rule objects containing one or more conditions and a corresponding action performable by the virtual switch on the packet, wherein processing the received packet includes, for each of the layer objects, performing, in the arranged sequence, the following operations:

determining whether a value in one or more of the header fields of the packet matches the one or more conditions of one of the rule objects in the group objects of the one of the layer objects;

in response to determining that the value in one or more of the header fields of the packet matches the one or more conditions of one of the rule objects in the group objects of the one of the layer objects, applying the action of the rule object to the packet; and passing the packet with the applied action to a next one of the layer objects and repeating the determining and applying operations according to rule objects in the next one of the layer objects.

2. The method of claim 1 wherein processing the received packet includes processing the received packet according to the hierarchy also containing a port object as a higher level object than the multiple layer objects, the port object being associated with a virtual port of the virtual switch connected to one of the virtual machines, and wherein the method further includes:
determining whether the packet is destined to the one of the virtual machines connected to the virtual port; and
in response to determining that the packet is destined to the one of the virtual machines connected to the virtual port, processing the received packet in accordance with the multiple layer, group, and rule objects in the port object.

3. The method of claim 1 wherein:
the layer objects are independently programmed to implement different processing policies on the received packet, the different processing policies individually include virtual network processing, network name translation processing, access control list processing, or metering processing.

4. The method of claim 1 wherein:
the layer objects are independently programmed to implement different processing policies on the received packet; and
the method further comprising processing the packet passed from the one of the layer object in accordance with another one of the layer object based on a state of the packet after the action is applied to the received packet.

5. The method of claim 1 wherein:
the layer objects are independently programmed to implement different processing policies on the received packet in a sequence;
the received packet is an incoming packet;
processing the received packet includes processing the received packet according to the layer objects in the sequence; and
the method further includes:
receiving, at the virtual switch, an outgoing packet; and
processing the received outgoing packet according to the layer objects in a reverse order of the sequence.

6. The method of claim 1 wherein applying the action of the rule object to the packet includes one of:
encapsulating or decapsulating the received packet with an additional header;
converting a virtual IP address of the received packet to a direct IP address;
blocking or allowing the received packet for forwarding to the virtual machine based on an access control list; or
adjusting a counter reflecting a number of packets received or transmitted to or from the virtual machine.

7. The method of claim 1 wherein the one of the layer object includes a first group object and a second group object, and wherein processing the received packet includes:
determining whether the value in one or more of the header fields of the packet matches the one or more conditions of one of the rule objects in the first group object;
in response to determining that the value in one or more of the header fields of the packet matches the one or more conditions of one of the rule objects in the first group object,
determining whether the first group object is marked as terminating; and
in response to determining that the first group object is marked as terminating, applying the action of the rule object to the packet without processing the received packet according to the rule objects in the second group object.

8. The method of claim 1 wherein the one of the layer object includes a first group object and a second group object, and wherein processing the received packet includes:
determining whether the value in one or more of the header fields of the packet matches the one or more conditions of one of the rule objects in the first group object;
in response to determining that the value in one or more of the header fields of the packet matches the one or more conditions of one of the rule objects in the first group object,
determining whether the first group object is marked as terminating; and
in response to determining that the first group object is not marked as terminating, processing the received packet according to the rule objects in the second group object without applying the action of the rule object in the first group object.

9. The method of claim 1, further comprising subsequent to processing the received packet according to all of the layer objects, forwarding the processed packet with accumulatively applied actions to one of the virtual machines.

10. A computing device in a distributed computing system having hosts individually supporting a virtual switch and one or more virtual machines, comprising:
a processor; and
a memory containing instructions executable by the processor to provide a virtual switch and cause the computing device to:
receive a packet having a header and a payload; and
in response to receiving the packet, at the virtual switch, processing the received packet based on multiple match action tables arranged in a hierarchy in which multiple layers are arranged in a sequence at the same level in the hierarchy and individually contain one or more groups that individually contain one or more rules, each of the rules containing an entry in one of the match action tables with a condition and an action, wherein to process the received packet includes, for each of the multiple layers, performing, in the arranged sequence, the following operations:
select one of the rules in each of the layers as matching the received packet; and
accumulatively apply the actions of the selected rules from the multiple layers to the received packet.

11. The computing device of claim 10 wherein to select one of the rules in each of the layers as matching the received packet includes to select only one rule in each of the layers as matching the received packet.

12. The computing device of claim 10 wherein:
the rules in each of the layers have corresponding priority values; and
to select one of the rules in each of the layers as matching the received packet includes to select only one rule with highest priority value as matching the received packet.

13. The computing device of claim 10 wherein to select one of the rules in each of the layers as matching the received packet includes to iterate through all groups in each of the layers to select one of the rules as matching the received packet.

14. The computing device of claim 10 wherein to select one of the rules in each of the layers as matching the received packet includes:
   to determine whether a value in one or more of the header fields of the packet matches the condition of one of the rules in one of the layers; and
   in response to determining that value in one or more of the header fields of the packet matches the condition of one of the rules in one of the layers, indicate that a matching rule is located.

15. The computing device of claim 10 wherein to select one of the rules in each of the layers as matching the received packet includes:
   to determine whether a value in one or more of the header fields of the packet matches the condition of one of the rules in one of the groups of one of the layers; and
   in response to determining that value in one or more of the header fields of the packet matches the condition of one of the rules in one of the groups of one of the layers, determine whether the one of the groups is marked as a terminating group; and
      in response to determining that the one of the groups is marked as a terminating group, terminate determining operations based on other rules in the other groups of the one of the layers.

16. The computing device of claim 10 wherein to select one of the rules in each of the layers as matching the received packet includes:
   to determine whether a value in one or more of the header fields of the packet matches the condition of one of the rules in one of the groups of one of the layers; and
   in response to determining that value in one or more of the header fields of the packet matches the condition of one of the rules in one of the groups of one of the layers, determine whether the one of the groups is marked as a terminating group; and
      in response to determining that the one of the groups is not marked as a terminating group, perform determining operations based on other rules in the other groups of the one of the layers.

17. A method for facilitation communication in a distributed computing system having hosts individually supporting a virtual switch and one or more virtual machines, comprising:
   receiving, at the virtual switch, a packet having a header and a payload;
   processing, at the virtual switch, the received packet based on multiple match action tables arranged in a hierarchy in which first and second layers are arranged in a sequence at the same level in the hierarchy and individually contain one or more match action tables that individually contain one or more entries each containing a condition and a corresponding processing action, wherein processing the received packet includes, for each of the first and second layers, performing, in the arranged sequence, the following operations:
      determining whether a value in the header of the packet matches a first condition of a first entry in one of the match action tables in the first layer;
      in response to determining that the value in the header of the packet matches the condition of the first entry, applying a first action of the first entry to the packet; and
      subsequent to applying the first action to the packet, determining whether the value in the header of the packet matches a second condition of second entry in another one of the match action tables in the second layer and in response to determining that the value in the header of the packet matches the second condition, applying a second action of the second entry to the packet in addition to applying the first action to the packet.

18. The method of claim 17 wherein:
   the first and second layers are independently arranged in a sequence; and
   processing the received packet includes processing the received packet according to the match action tables in the first and second layers according to the sequence.

19. The method of claim 17 wherein:
   the first and second layers are independently programmed to implement different processing policies on the received packet;
   the received packet is an incoming packet;
   processing the received packet includes processing the received packet according to the layer objects in the sequence; and
   the method further includes:
      receiving, at the virtual switch, an outgoing packet; and
      processing the received outgoing packet according to the layer objects in a reverse order of the sequence.

20. The method of claim 17 wherein applying the first or second action includes one of:
   encapsulating or decapsulating the received packet with an additional header;
   converting a virtual IP address of the received packet to a direct IP address; or
   blocking or allowing the received packet for forwarding to the virtual machine based on an access control list.

* * * * *